United States Patent
Bales et al.

(10) Patent No.: US 11,983,582 B2
(45) Date of Patent: May 14, 2024

(54) WIRELESS COMMUNICATION SERVICE FOR ITEMS THAT WIRELESSLY TRANSMIT PRODUCT IDENTIFIERS AND NETWORK IDENTIFIERS

(71) Applicant: T-MOBILE INNOVATIONS LLC, Overland Park, KS (US)

(72) Inventors: Mark Richard Bales, Lee's Summit, MO (US); Lyle T. Bertz, Lee's Summit, MO (US); Ahmad Arash Obaidi, Issaquah, WA (US); Lyle Walter Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 234 days.

(21) Appl. No.: 17/707,031

(22) Filed: Mar. 29, 2022

(65) Prior Publication Data

US 2023/0315550 A1 Oct. 5, 2023

(51) Int. Cl.
*G06F 9/54* (2006.01)
*H04W 12/06* (2021.01)
*H04W 48/18* (2009.01)

(52) U.S. Cl.
CPC ............ *G06F 9/547* (2013.01); *H04W 12/06* (2013.01); *H04W 48/18* (2013.01)

(58) Field of Classification Search
CPC ................................ G06F 9/505; G06Q 30/08
USPC ................................ 455/434, 410; 370/329
See application file for complete search history.

(56) References Cited

U.S. PATENT DOCUMENTS

| | | | |
|---|---|---|---|
| 8,249,927 B2 | 8/2012 | Sahai | |
| 8,528,817 B2 | 9/2013 | Snyder et al. | |
| 9,443,407 B2 | 9/2016 | Davidson | |
| 10,362,179 B2 | 7/2019 | Harris | |
| 10,817,574 B2 | 10/2020 | Rothschild | |
| 2016/0021049 A1 | 1/2016 | Virtanen et al. | |
| 2017/0289781 A1 | 10/2017 | Ojala et al. | |
| 2018/0225675 A1 | 8/2018 | Rosenberg | |
| 2023/0180017 A1* | 6/2023 | Gadalin | H04W 16/14 370/328 |
| 2023/0276352 A1* | 8/2023 | Wang | H04L 41/5041 455/434 |

* cited by examiner

*Primary Examiner* — Kiet M Doan

(57) ABSTRACT

In a wireless communication network, a wireless network controller authenticates a wireless receiver and transfers receiver instructions and Application Programming Interfaces (APIs) for wireless network slices to the wireless receiver. An item wirelessly transmits a network identifier (ID) and a product ID. The wireless receiver wirelessly detects the network ID and the product ID from the item at a geographic location. The receiver selects an API for a wireless network slice based on the receiver instructions and the network ID. The receiver transfers an API call to the wireless network slice. The wireless network slice selects a distributed Application (dAPP) based on the network ID, the product ID, and/or the geographic location for the item. The wireless network slice transfers the network ID, the product ID, and the geographic location for the item to selected dAPP.

20 Claims, 11 Drawing Sheets

WIRELESS COMMUNICATION SERVICE FOR ITEMS THAT WIRELESSLY TRANSMIT PRODUCT IDENTIFIERS AND NETWORK IDENTIFIERS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), Bluetooth Low Energy (BLE), Low-Power Wide Area Network (LP-WAN), Internet-of-Things (IoT), Near Field Communications (NFC), and the like. The wireless access nodes exchange network signaling and user data with network elements that are often clustered together into wireless network cores. The wireless network elements comprise Access and Mobility Management Functions (AMFs), Application Functions (AFs), User Plane Functions (UPFs), and the like. Some of the network elements are grouped into wireless network slices that are typically optimized for a specific user applications like low-latency and IoT.

Electromagnetic power harvesting microprocessors have wireless receivers that wirelessly receive ambient wireless signals and store the energy from these signals in capacitors for subsequent use. The microprocessors may be embedded in another product and use their harvested energy to wirelessly broadcast an identifier or code for the product. One example of a product code is the Global Trade Item Number (GTIN) that is indicated by a bar-code on many products. The GTIN is linked to data like product name and price.

Distributed ledgers execute Distributed Applications (dAPPs) that perform data transactions and store transaction results in a blockchain format. The blockchain format uses multiple geo-diverse nodes that store redundant data blocks. Each data block includes a hash of the previous data block. The multiple geo-diverse nodes and the previous block hashes make the ledger data immutable. The number of distributed ledgers and dAPPs that process user data is proliferating.

Unfortunately, the wireless communication networks have not effectively integrated the electromagnetic power harvesting microprocessors with the dAPPs. Moreover, the wireless communication networks do not efficiently use wireless network slices to link the electromagnetic power harvesting microprocessors with the dAPPs.

TECHNICAL OVERVIEW

In a wireless communication network, a wireless network controller authenticates a wireless receiver and transfers receiver instructions and Application Programming Interfaces (APIs) for wireless network slices to the wireless receiver. An item wirelessly transmits a network identifier (ID) and a product ID. The wireless receiver wirelessly detects the network ID and the product ID from the item at a geographic location. The receiver selects an API for a wireless network slice based on the receiver instructions and the network ID. The receiver transfers an API call to the wireless network slice. The wireless network slice selects a distributed Application (dAPP) based on the network ID, the product ID, and/or the geographic location for the item. The wireless network slice transfers the network ID, the product ID, and the geographic location for the item to selected dAPP.

DETAILED DESCRIPTION

Figure 1:
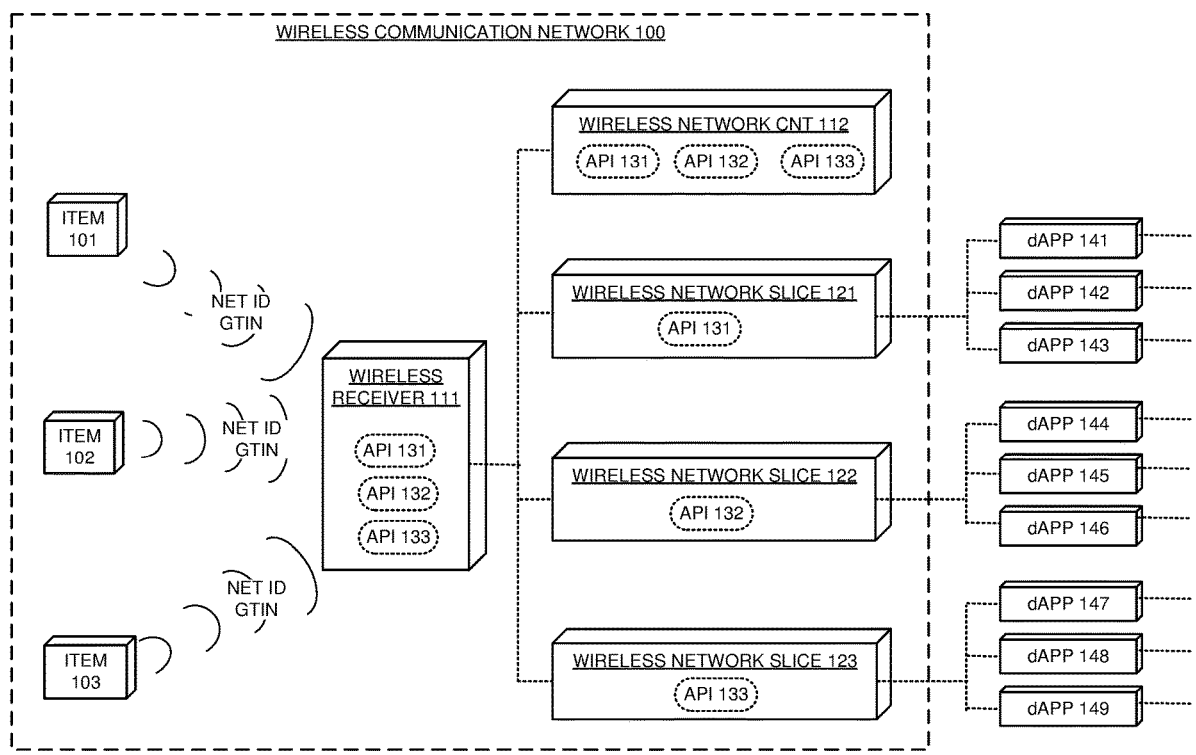
FIG. 1 illustrates an exemplary wireless communication network to serve items that wirelessly transmit their network Identifiers (IDs) and product IDs.

FIG. 1 illustrates exemplary wireless communication network 100 to serve items 101-103 that wirelessly transmit their network identifiers (IDs) and product IDs. Wireless communication system 100 comprises items 101-103, wireless receiver 111, and wireless network slices 121-123. Wireless network slice 121 comprises Application Programming Interface (API) 131 and interacts with Distributed Applications (dAPPs) 141-143. Wireless network slice 122 comprises API 132 and interacts with dAPPs 144-146. Wireless network slice 122 comprises API 133 and interacts with dAPPs 147-149. Items 101-103 comprise food and beverage products, tools and machines, and/or some other consumer good. In some examples, items 101-103 comprise recyclable containers like plastic bottles that have integrated electromagnetic power harvesting microprocessors. Wireless network controller 112 comprises an Access and Mobility Management Function (AMF), Unified Data Management (UDM), and/or some other network elements. Wireless network slices 121-123 comprise Application Functions (AFs), User Plane Functions (UPFs), Session Management Functions (SMFs), and/or some other network elements.

Various examples of network operation and configuration are described herein. In some examples, wireless receiver 111 exchanges network signaling with wireless network controller 112. Wireless network controller 112 authenticates wireless receiver 111 based on the signaling and responsively transfers receiver instructions and APIs 131-133 for wireless network slices 121-123 to the wireless receiver 111. Wireless network controller 112 selects the receiver instructions and APIs 131-133 for wireless network slices 121-123 based on the identity and location of wireless receiver 111. Wireless receiver 110 receives the receiver instructions and APIs 131-133 for respective wireless network slices 121-123 from wireless network controller 112.

Item 101 wirelessly transmits its network ID and product ID proximate to wireless receiver 111. The network ID is unique within wireless communication network 100, and the product ID comprises a Global Trade Item Number (GTIN) or some other item identifier. Wireless receiver 111 wirelessly detects the network ID and the product ID that were wirelessly transmitted by item 101 at the geographic location. Wireless receiver 111 selects API 131 for wireless network slice 121 based on the receiver instructions, the network ID, and possibly the product ID and/or the geographic location. For example, the receiver instructions may comprise a data structure that translates network IDs into slice APIs. Wireless receiver 111 generates an API call that indicates the network ID, the product ID, and the geographic location for item 101 based on selected API 131. Wireless receiver 111 transfers the API call for delivery to selected wireless network slice 121. Selected wireless network slice 121 receives the API call that indicates the network ID, the product ID, and the geographic location for item 101. Wireless network slice 121 selects dAPP 141 for item 101 based on at least one of the network ID, the product ID, and the geographic location for item 101. Wireless network slice 121 transfers the network ID, the product ID, and the geographic location for item 101 to selected dAPP 141. Selected dAPP 141 processes the network ID, the product ID, and the geographic location for the item 101 to generate and transfer an item result.

Item 102 wirelessly transmits its network ID and product ID proximate to wireless receiver 111. Wireless receiver 111 wirelessly detects the network ID and the product ID that were wirelessly transmitted by item 102 at the geographic location. Wireless receiver 111 selects API 132 for wireless network slice 122 based on the receiver instructions, the network ID, and possibly the product ID and/or the geographic location. Wireless receiver 111 generates an API call that indicates the network ID, the product ID, and the geographic location for item 102 based on selected API 132. Wireless receiver 111 transfers the API call for delivery to selected wireless network slice 122. Selected wireless network slice 122 receives the API call that indicates the network ID, the product ID, and the geographic location for item 102. Wireless network slice 122 selects dAPPs 144-145 for item 102 based on at least one of the network ID, the product ID, and the geographic location for item 102. Wireless network slice 122 transfers the network ID, the product ID, and the geographic location for item 102 to selected dAPPs 144-145. Selected dAPPs 144-145 process the network ID, the product ID, and the geographic location for the item 102 to generate and transfer item results.

Item 103 wirelessly transmits its network ID and product ID proximate to wireless receiver 111. Wireless receiver 111 wirelessly detects the network ID and the product ID that were wirelessly transmitted by item 102 at the geographic location. Wireless receiver 111 selects APIs 132-133 for wireless network slices 122-123 based on the receiver instructions, the network ID, and possibly the product ID and/or the geographic location. Wireless receiver 111 generates API calls that indicate the network ID, the product ID, and the geographic location for item 103 based on selected APIs 132-133. Wireless receiver 111 transfers the API calls for delivery to selected wireless network slices 122-123. Selected wireless network slices 122-123 receive the API calls that indicate the network ID, the product ID, and the geographic location for item 103. Wireless network slice 123 selects dAPP 146 and dAPP 149 that are associated with item 103 based on at least one of the network ID, the product ID, and the geographic location for item 103. Wireless network slice 122 transfers the network ID, the product ID, and the geographic location for item 103 to selected dAPP 146. Wireless network slice 123 transfers the network ID, the product ID, and the geographic location for item 103 to selected dAPP 149. Selected dAPPs 146 and 149 process the network ID, the product ID, and the geographic location for the item 103 to generate and transfer item results.

Advantageously, wireless communication network 100 effectively integrates items 101-103 and dAPPs 141-149. Moreover, wireless communication network 100 efficiently uses wireless network slices 121-123 to link items 101-103 with dAPPs 141-149.

Items 101-103 and wireless receiver 111 wirelessly communicate using a low-power wireless protocol like Institute of Electrical and Electronic Engineers (IEEE) 802.11 (WIFI), Bluetooth Low Energy (BLE), Internet-of-Things (IoT), Radio Frequency Identification (RFID), Near Field Communications (NFC), Low-Power Wide Area Network (LP-WAN), or the like. Wireless receiver 111, wireless network slices 121-123, and dAPPs 141-149 communicate over network connections that comprise metallic wiring, glass fibers, radio channels, or some other communication media. The network connections may use Fifth Generation New Radio (5GNR), Long Term Evolution (LTE), WIFI, LP-WAN, IEEE 802.3 (ETHERNET), Internet Protocol (IP), Time Division Multiplex (TDM), Data Over Cable System Interface Specification (DOCSIS), Synchronous Optical Network (SONET), virtual switching, inter-processor communication, bus interfaces, and/or some other data communication protocols. Items 101-103, wireless receiver 111, and wireless network slices 121-123 comprise microprocessors, software, memories, transceivers, radios, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, radio applications, and network applications. The microprocessors retrieve the software from the memories and execute the software to drive the operation of wireless communication network 100 as described herein.

Figure 2:
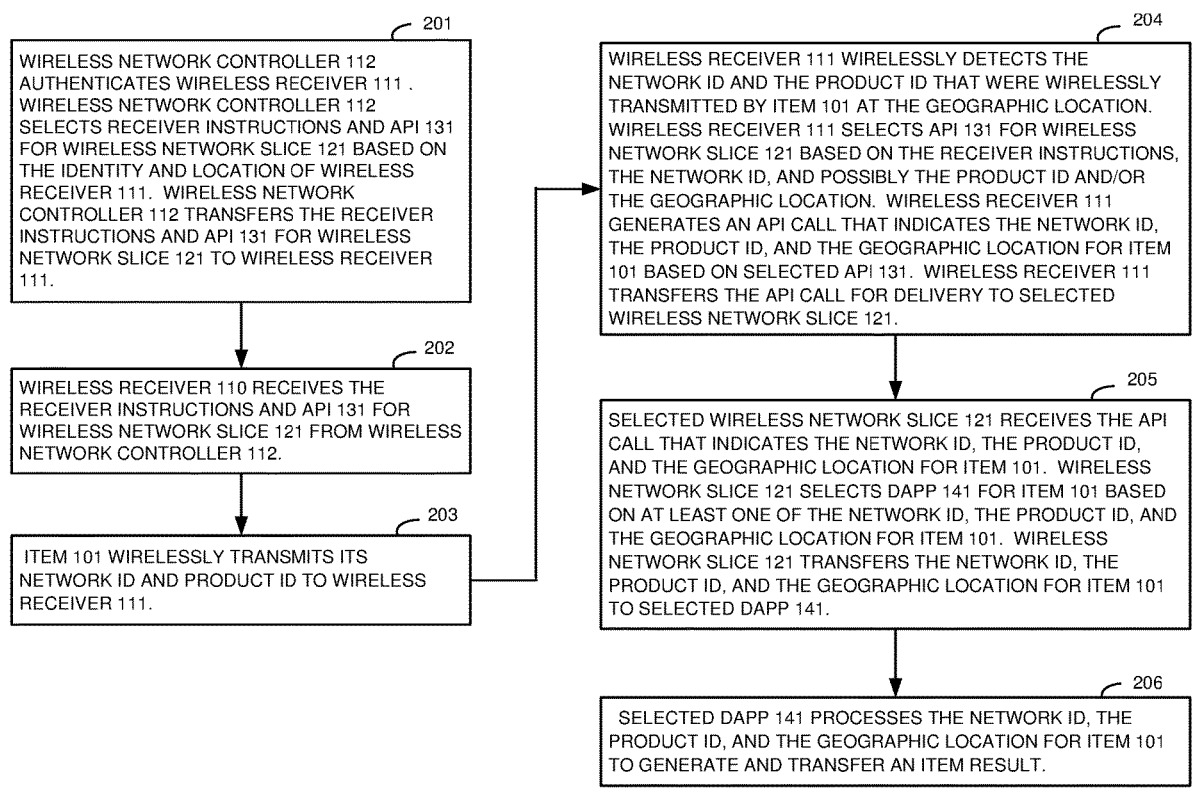
FIG. 2 illustrates an exemplary operation of the wireless communication network to serve the items that wirelessly transmit their network IDs and product IDs.

FIG. 2 illustrates an exemplary operation of wireless communication network 100 to serve items 101-103 that wirelessly transmit their network IDs and product IDs. The operation may vary in other examples. Wireless network controller 112 authenticates wireless receiver 111 (201). Wireless network controller 112 selects receiver instructions and API 131 for wireless network slice 121 based on the identity and location of wireless receiver 111 (201). Wireless network controller 112 transfers the receiver instructions and API 131 for wireless network slice 121 to wireless receiver 111 (201). Wireless receiver 110 receives the receiver instructions and API 131 for wireless network slice 121 from wireless network controller 112 (202). Item 101 wirelessly transmits its network ID and product ID to wireless receiver 111 (203). Wireless receiver 111 wirelessly detects the network ID and the product ID that were wirelessly transmitted by item 101 at the geographic location (204). Wireless receiver 111 selects API 131 for wireless network slice 121 based on the receiver instructions, the network ID, and possibly the product ID and/or the geographic location (204). Wireless receiver 111 generates an API call that indicates the network ID, the product ID, and the geographic location for item 101 based on selected API 131 (204). Wireless receiver 111 transfers the API call for delivery to selected wireless network slice 121 (204). Selected wireless network slice 121 receives the API call that indicates the network ID, the product ID, and the geographic location for item 101 (205). Wireless network slice 121 selects dAPP 141 that is associated with item 101 based on at least one of the network ID, the product ID, and the geographic location for item 101 (205). Wireless network slice 121 transfers the network ID, the product ID, and the geographic location for item 101 to selected dAPP 141 (205). Selected dAPP 141 processes the network ID, the product ID, and the geographic location for item 101 to generate and transfer an item result (206).

Figure 3:
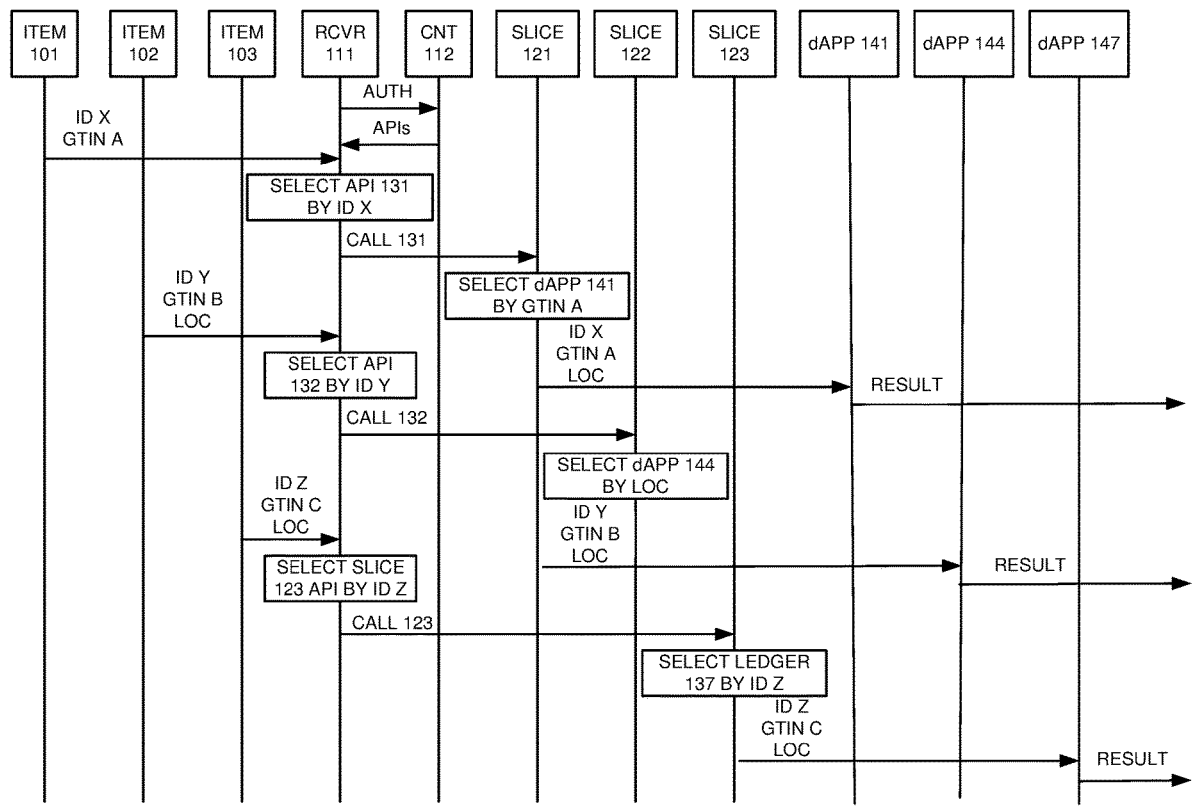
FIG. 3 illustrates an exemplary operation of the wireless communication network to serve the items that wirelessly transmit their network IDs and product IDs.

FIG. 3 illustrates an exemplary operation of wireless communication network 100 to serve items 101-103 that wirelessly transmit their network IDs and product IDs. The operation may vary in other examples. In this example, the products IDs comprise Global Trade Item Numbers (GTINs) but other identifiers could be used. Wireless receiver 111 requests service from wireless network controller 112. Wireless network controller 112 authenticates wireless receiver 111 and responsively transfers receiver instructions and APIs 131-133 for wireless network slices 121-123 to the wireless receiver 111.

Item 101 wirelessly transmits its network ID X and GTIN A to wireless receiver 111. Wireless receiver 111 wirelessly detects network ID X and GTIN A from item 101 at the geographic location. Wireless receiver 111 selects API 131 for wireless network slice 121 based on the receiver instructions and network ID X. Wireless receiver 111 generates an API call that indicates the network ID, the product ID, and the geographic location for item 101 based on selected API 131. Wireless receiver 111 transfers the API call to selected wireless network slice 121. Wireless network slice 121 selects dAPP 141 based on GTIN A for item 101. Wireless network slice 121 transfers network ID X, GTIN A, and the geographic location for item 101 to selected dAPP 141. Selected dAPP 141 processes network ID X, GTIN A, and the geographic location for the item 101 to generate and transfer an item result.

Item 102 wirelessly transmits its network ID Y and GTIN B to wireless receiver 111. Wireless receiver 111 wirelessly detects network ID Y and GTIN B from item 102 at the geographic location. Wireless receiver 111 selects API 132 for wireless network slice 122 based on the receiver instructions and network ID Y. Wireless receiver 111 generates an API call that indicates network ID Y, GTIN B, and the geographic location for item 102 based on selected API 132. Wireless receiver 111 transfers the API call to selected wireless network slice 122. Wireless network slice 122 selects dAPP 144 based on geographic location for item 102. Wireless network slice 122 transfers network ID Y, GTIN B, and the geographic location for item 102 to selected dAPP 144. Selected dAPP 144 processes network ID Y, GTIN B, and the geographic location for the item 102 to generate and transfer an item result.

Item 103 wirelessly transmits its network ID Z and GTIN C to wireless receiver 111. Wireless receiver 111 wirelessly detects network ID Z and GTIN C from item 103 at the geographic location. Wireless receiver 111 selects API 133 for wireless network slice 123 based on the receiver instructions and network ID Z. Wireless receiver 111 generates an API call that indicates network ID Z, GTIN C, and the geographic location for item 103 based on selected API 133. Wireless receiver 111 transfers the API call to selected wireless network slice 123. Wireless network slice 123 selects dAPP 147 based on network ID Z for item 102. Wireless network slice 122 transfers network ID Z, GTIN C, and the geographic location for item 103 to selected dAPP 147. Selected dAPP 147 processes network ID Z, GTIN C, and the geographic location for the item 103 to generate and transfer an item result.

Figure 4:
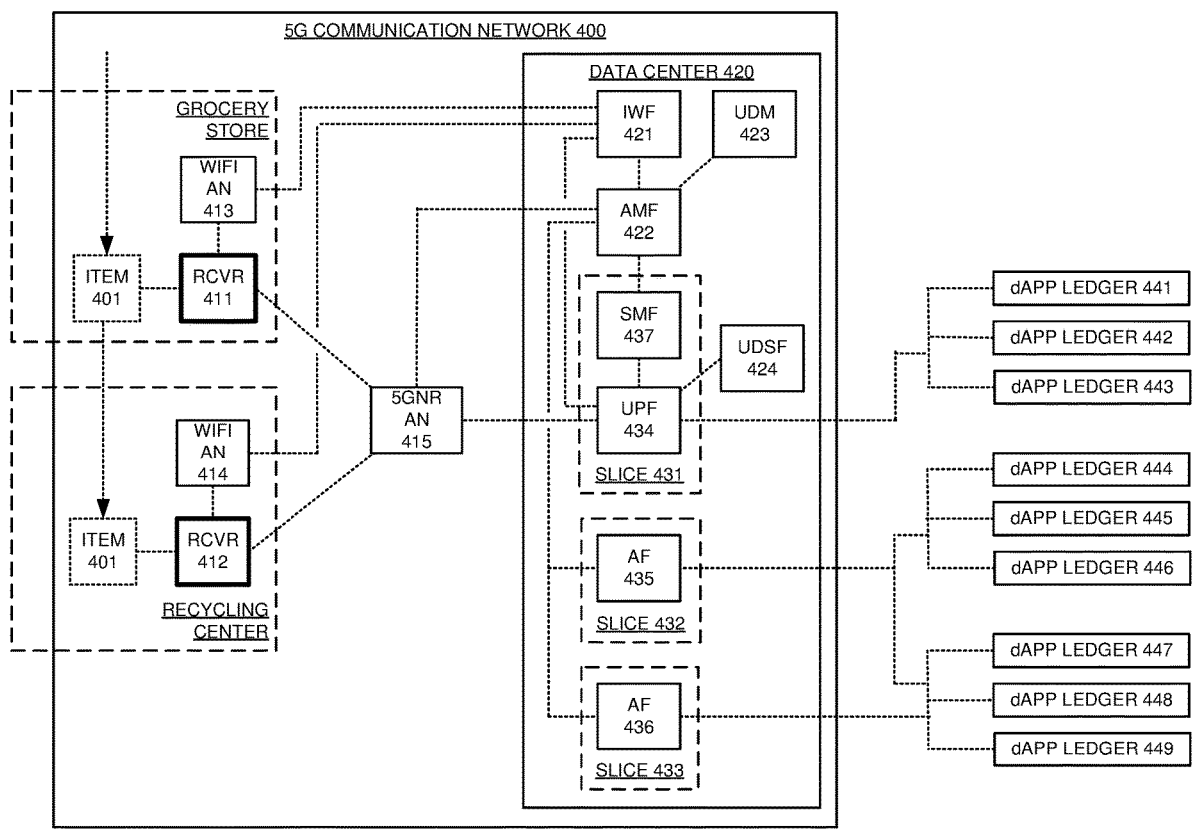
FIG. 4 illustrates an exemplary Fifth Generation (5G) communication network to serve an item that wirelessly transmits a 5G Network Identifier (5GID) and a Global Tracking Item Number (GTIN).

FIG. 4 illustrates exemplary Fifth Generation (5G) communication network to serve item 401 that wirelessly transmits a 5G Network Identifier (5GID) and a Global Tracking Item Number (GTIN). 5G communication network 400 comprises an example of wireless communication network 100, although network 100 may differ. 5G communication network 400 comprises: item 401, wireless receivers (RCVRs) 411-412, WIFI Access Nodes (ANs) 413-414, 5GNR AN 415, network data center 420, and dAPP ledgers 441-449. Network data center 420 comprises Interworking Function (IWF) 421, Access and Mobility Management Function (AMF) 422, Unified Data Management (UDM) 423, Unstructured Data Storage Function (UDSF) 424, and wireless network slices 431-433. Wireless network slice 431 comprises Session Management Function (SMF) 433 and User Plane Function (UPF) 434. Wireless network slice 432 comprises Application Function (AF) 435. Wireless network slice 433 comprises AF 436. dAPP ledger 441 comprises a group of networked computers that execute the same dAPP to generate and maintain a distributed ledger. dAPP ledgers 442-449 are similar to dAPP ledger 441, but dAPP ledgers 442-449 execute different dAPPs and have different ledger content.

Before serving item 401, wireless receiver 111 exchanges network signaling with AMF 422 over WIFI AN 413 and IWF 421 or over 5GNR AN 415. AMF 422 interacts with UDM 423 to authenticate the identity of wireless receiver 411. Authentication entails verifying a secret ID code in receiver 411 by issuing a random number challenge and comparing the AN's hash of its secret ID code and the random number to the expected result. AMF 422 determines a geographic location of receiver 411 based on proximity to 5GNR AN 415, a location report from receiver 411, or some other technique. AMF 422 interacts with UDM 423 to select slices 431-433, their APIs, and API selection instructions for wireless receiver 411 based on its identity and location. AMF 422 transfers the instructions and APIs for slices 431-433 to wireless receiver 411. The API selection instructions may comprise a data structure that correlates 5GIDs and possibly GTINs with individual APIs for slices 431-433. For slice 431, AMF 422 signals SMF 437 to serve the slice to wireless receiver 411. SMF 437 signals UPF 434 to serve the slice to wireless receiver 411 over 45NR AN 415 and/or IWF 422. Item 401 arrives at the grocery store, harvests ambient energy, and wirelessly transfers its 5GID and GTIN. The 5GID individually identifies item 401 in network 400. The GTIN identifies item 401 using the standard GS-1 product characterization methodology. Wireless receiver 411 wirelessly detects the 5GID and the GTIN that were wirelessly transmitted by item 401 at the grocery store. Wireless receiver 411 selects an API for slice 431 based on the API selection instructions and 5G ID. Wireless receiver 411 generates an API call that indicates the 5G ID, the GTIN, and the geographic location for item 401 based on the selected API. Wireless receiver 411 transfers the API call to UPF 434 over 5GNR AN 415 or WIFI AN 413-IWF 421. UPF 434 transfers the 5G ID, GTIN, and location for item 401 to UDSF 424. UDSF 424 selects dAPP ledger 443 based on the 5G ID for item 401. UDSF 424 indicates dAPP ledger 443 to UPF 434. UPF 434 transfers the 5G ID, GTIN, and location for item 401 to selected dAPP ledger 443. Selected dAPP 443 ledger processes the 5G ID, the GTIN, and the geographic location for the item 401 to generate and transfer an item result like a grocery store inventory update.

Before serving item 401, wireless receiver 112 exchanges network signaling with AMF 422 over WIFI AN 413 and IWF 421 or over 5GNR AN 415. AMF 422 interacts with UDM 423 to authenticate the identity of wireless receiver 412. AMF 422 determines a geographic location of receiver 412. AMF 422 interacts with UDM 423 to select slices 432-433, their APIs, and API selection instructions for wireless receiver 412 based on its identity and location. AMF 422 transfers the instructions and APIs for slices 431-432 to wireless receiver 412. Item 401 arrives at the recycling center, harvests ambient energy, and wirelessly transfers its 5GID and GTIN. The 5GID individually identifies item 401 in network 400. The GTIN identifies item 401 using the standard GS-1 product characterization methodology. Wireless receiver 412 wirelessly detects the 5GID and the GTIN that were wirelessly transmitted by item 401 at the recycling center. Wireless receiver 412 selects an API for slice 433 based on the API selection instructions. Wireless receiver 412 generates an API call that indicates the 5G ID, the GTIN, and the geographic location for item 401 based on the selected API. Wireless receiver 412 transfers the API call to AMF 422 over an N1 link that traverses 5GNR AN 415 or WIFI AN 413 and IWF 421. AMF 422 transfers the API call to slice 433 to AF 436. AF 436 interacts with UDSF 424 to select dAPP ledger 448 based on the GTIN for item 401. UDSF 424 indicates dAPP ledger 448 to AF 436. AF 436 transfers the 5G ID, GTIN, and location for item 401 to selected dAPP ledger 448. Selected dAPP ledger 448 processes the 5G ID, the GTIN, and the geographic location for the item 401 to generate and transfer an item result like a recycling credit for item 101.

Figure 5:
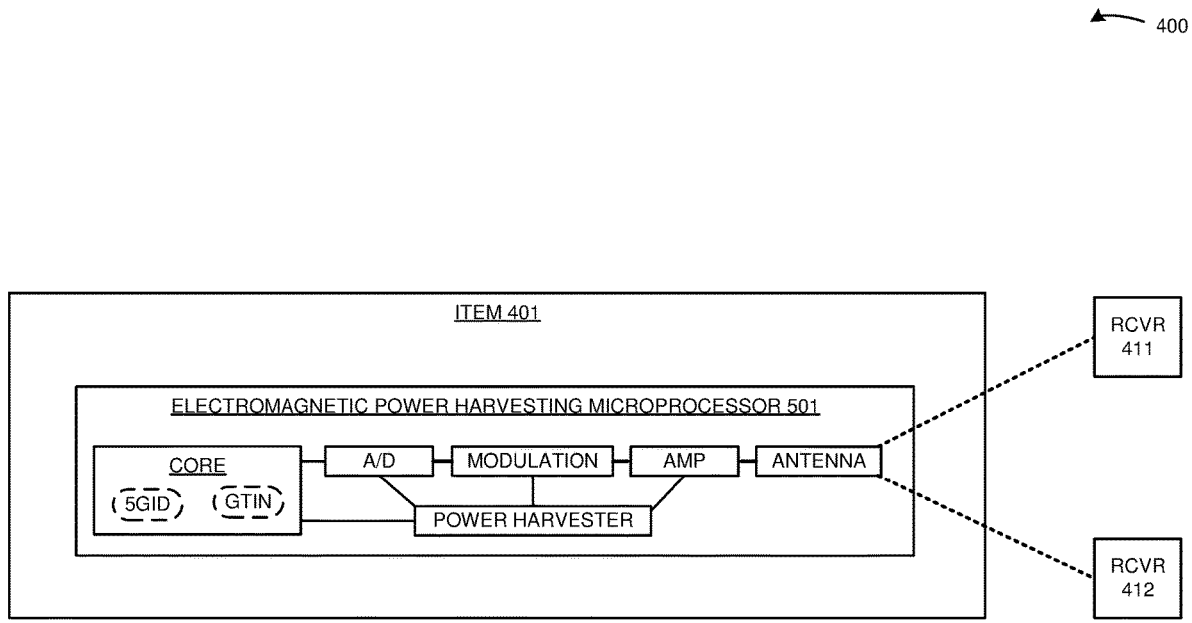
FIG. 5 illustrates an exemplary item in the 5G communication network.

FIG. 5 illustrates exemplary item 401 in 5G communication network 400. Item 401 comprises an example of items 101-103, although items 101-103 may differ. Item 401 comprises electromagnetic power harvesting microprocessor 501. Electromagnetic power harvesting microprocessor 501 comprises a power harvester, processing core, antenna, amplifier, modulation, and analog-to-digital interface that are coupled over bus and power circuitry. The power harvester receives ambient wireless signals and stores the energy in capacitors or another medium. The core drives the analog-to-digital interface to broadcast the 5GID and GTIN for item 401 over the modulation, amplifier, and antenna. The antenna wirelessly transfers the 5GID and GTIN for item 401 to wireless receivers 411-412 when in range.

Figure 6:
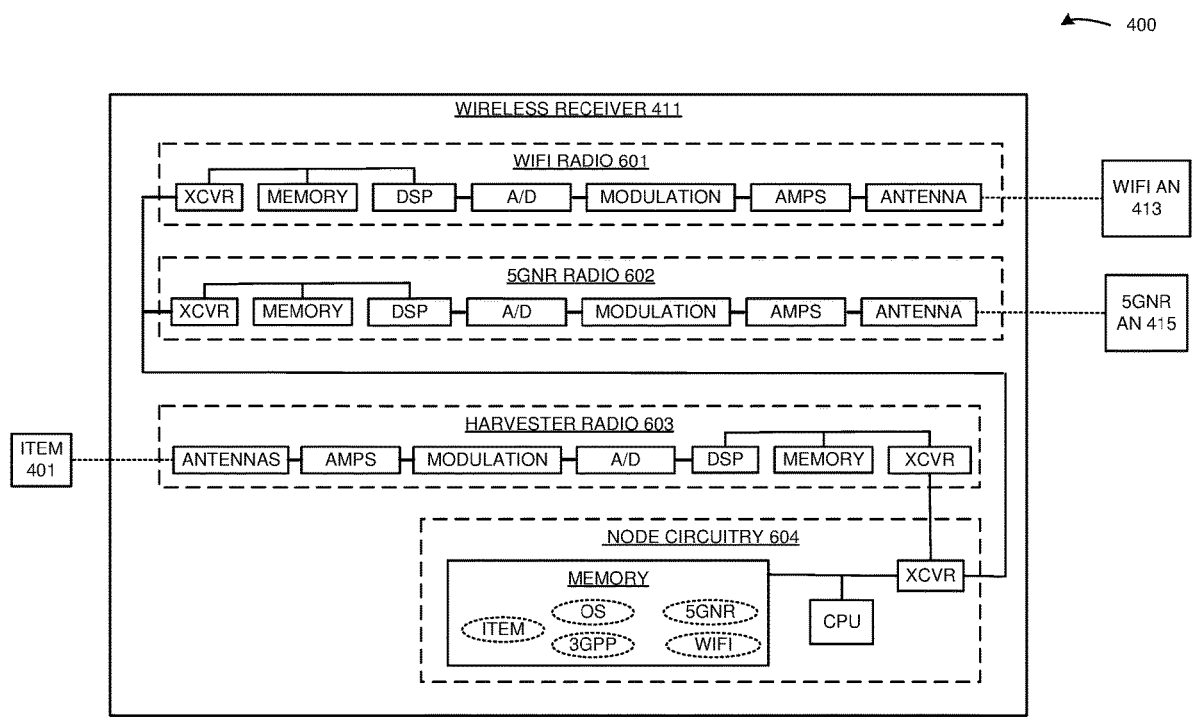
FIG. 6 illustrates an exemplary wireless receiver in the 5G communication network.

FIG. 6 illustrates exemplary wireless receiver 411 in 5G communication network 400. Wireless receiver 411 comprises an example of wireless receivers 111 and 412, although receivers 111 and 412 may differ. Wireless receiver 411 comprises WIFI radio 601, 5GNR radio 602, harvester radio 603, and node circuitry 604. Radios 601-603 comprise antennas, amplifiers, filters, modulation, analog-to-digital interfaces, DSP, memory, and transceivers that are coupled to node circuitry 604 over bus circuitry. Node circuitry 604 comprises memory, CPU, and transceivers that are coupled over bus circuitry. The memory in node circuitry 604 stores an operating system, item interface application (ITEM), and network applications for 3GPP, WIFI, and 5GNR. The antennas in WIFI radio 601 are wirelessly coupled to WIFI AN 413 over a WIFI link. The antennas in 5GNR radio 602 are wirelessly coupled to 5GNR AN 415 over a 5GNR link. The antennas in harvester radio 603 wirelessly receive data signals from item 401 over an item broadcast frequency. The CPU in node circuitry 603 executes the operating system and item interface application to receive the 5GID and GTIN from item 401. The CPU in node circuitry 603 executes the operating system and network applications to transfer the 5GID, GTIN, and location for item 401 to selected slices 431-433 using their selected APIs.

Figure 7:
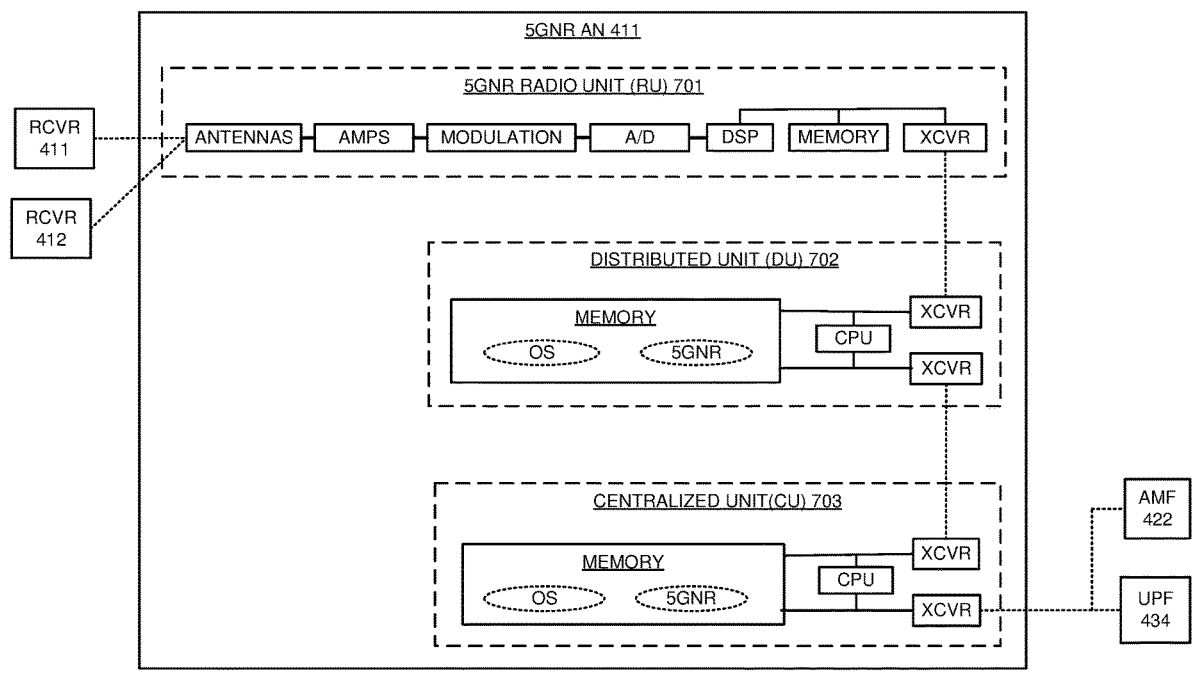
FIG. 7 illustrates exemplary an 5G New Radio (NR) Access Node (AN) in the 5G communication network.

FIG. 7 illustrates exemplary 5G New Radio (NR) Access Node (AN) 415 in 5G communication network 400. 5GNR AN 415 comprises 5GNR Radio Unit (RU) 701, Distributed Unit (DU) 702, and Centralized Unit (CU) 703. 5GNR RU 701 comprises antennas, amplifiers, filters, modulation, analog-to-digital interfaces, DSP, memory, radio applications, and transceivers that are coupled over bus circuitry. DU 702 comprises memory, CPU, user interfaces and components, and transceivers that are coupled over bus circuitry. The memory in DU 702 stores operating system and 5GNR network applications for physical layer, media access control, and radio link control. CU 703 comprises memory, CPU, and transceivers that are coupled over bus circuitry. The memory in CU 703 stores an operating system and 5GNR network applications for packet data convergence protocol, service data adaption protocol, and radio resource control. The antennas in 5GNR RU 701 are wirelessly coupled to wireless receivers 411-412 over 5GNR links. Transceivers in 5GNR RU 701 are coupled to transceivers in DU 702. Transceivers in DU 702 are coupled to transceivers in CU 703. Transceivers in CU 703 are coupled AMF 421 and UPF 434. The DSP and CPU in RU 701, DU 702, and CU 703 execute the radio applications, operating systems, and network applications to exchange data and signaling with receivers 411-412, AMF 421, and UPF 434.

Figure 8:
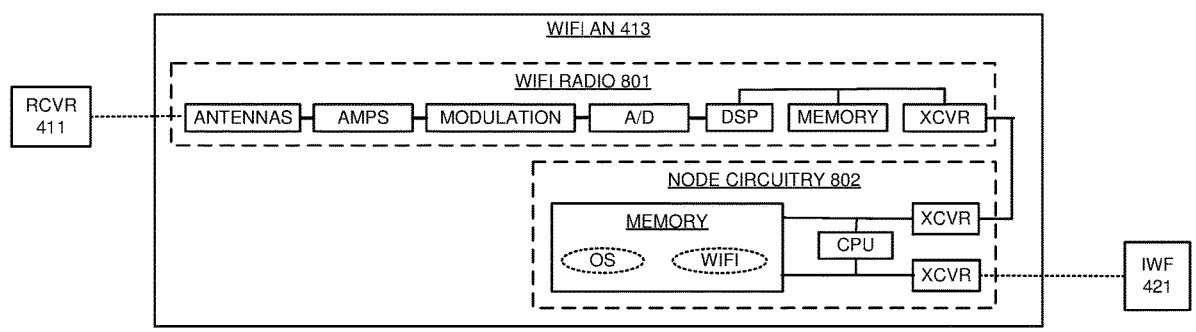
FIG. 8 illustrates an exemplary IEEE 802.11 (WIFI) AN in the 5G communication network.

FIG. 8 illustrates exemplary IEEE 802.11 (WIFI) AN 413 in 5G communication network 400. WIFI AN 413 comprises an example of WIFI AN 414, although AN 414 may differ. WIFI AN 413 comprises WIFI radio 801 and node circuitry 802. WIFI radio 801 comprises antennas, amplifiers, filters, modulation, analog-to-digital interfaces, DSP, memory, and transceivers that are coupled over bus circuitry. Node circuitry 802 comprises memory, CPU, user interfaces and components, and transceivers that are coupled over bus circuitry. The memory in node circuitry 802 stores an operating system and network applications for WIFI. The antennas in WIFI radio 801 are wirelessly coupled to wireless receiver 411 over a WIFI link. Transceivers in WIFI radio 801 are coupled to transceivers in node circuitry 802. Transceivers in node circuitry 802 are coupled to transceivers in IWF 421. The CPU in node circuitry 802 executes the operating system and network applications to exchange signaling and data between wireless receiver 411 and IWF 421.

Figure 9:
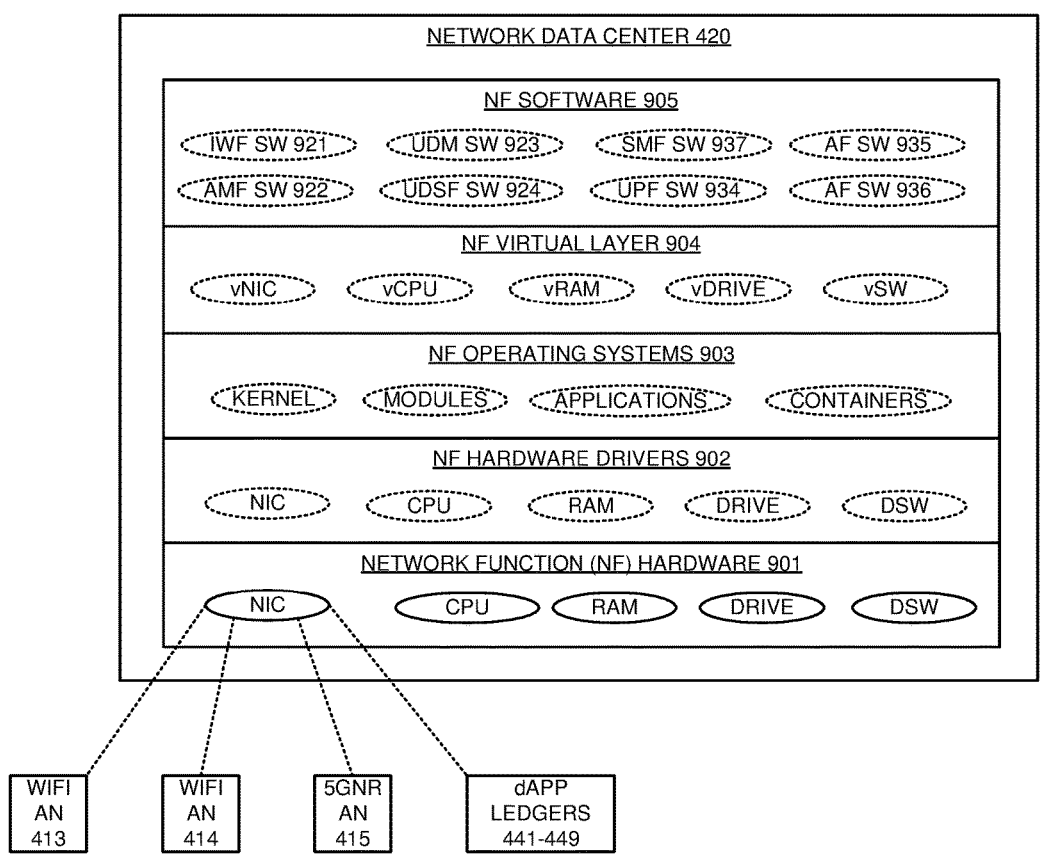
FIG. 9 illustrates an exemplary data center in the 5G communication network.

FIG. 9 illustrates an exemplary data center 420 in 5G communication network 400. Network data center 420 comprises an example of wireless network controller 112 and wireless network slices 121-123, although controller 112 and slices 121-123 may differ. Network data center 420 comprises Network Function (NF) hardware 901, NF hardware drivers 902, NF operating systems 903, NF virtual layer 904, and NF Software (SW) 905. NF hardware 901 comprises Network Interface Cards (NICs), CPU, RAM, Flash/Disk Drives (DRIVE), and Data Switches (DSW). NF hardware drivers 902 comprise software that is resident in the NIC, CPU, RAM, DRIVE, and DSW. NF operating systems 903 comprise kernels, modules, and applications that form containers for virtual layer and NF software execution. NF virtual layer 904 comprises vNIC, vCPU, vRAM, vDRIVE, and vSW. NF SW 905 comprises IWF SW 921, AMF SW 922, UDM SW 923, UDSF SW 924, SMF SW 933, UPF SW 934, AF SW 935, and AF SW 936. Other NF SW like Network Repository Function (NRF) SW are typically present but are omitted for clarity. Network data center 420 may be located at a single site or be distributed across multiple geographic locations. The NIC in NF hardware 901 are coupled to WIFI AN 413, WIFI AN 414, 5GNR AN 415, and dAPP ledgers 441-449. NF hardware 901 executes NF hardware drivers 902, NF operating systems 903, NF virtual layer 904, and NF SW 905 to form and operate IWF 421, AMF 422, UDM 423, UDSF 424, UPF 434, AF 435, AF 436, and SMF 437.

Figure 10:
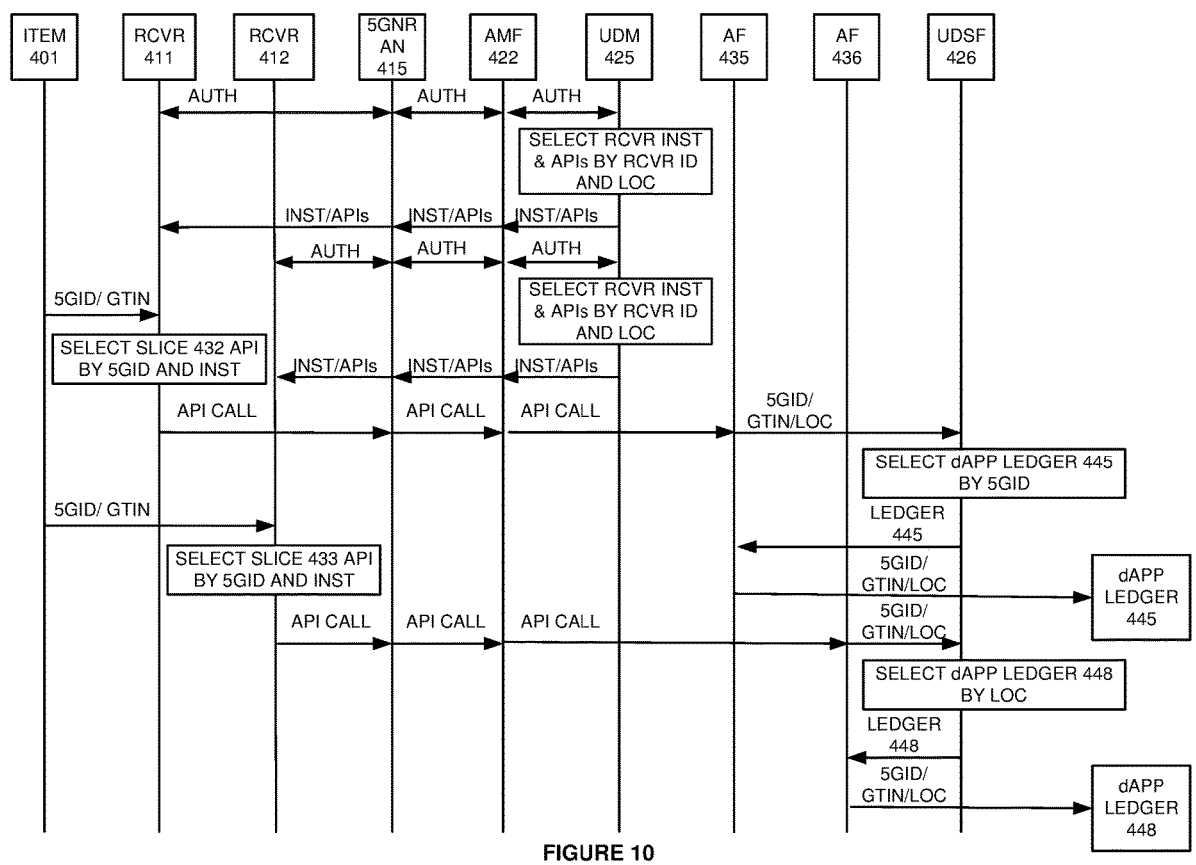
FIG. 10 illustrates an exemplary operation of the 5G communication network to serve the item that wirelessly transmits the 5GID and the GTIN.

FIG. 10 illustrates an exemplary operation of 5G communication network 400 to serve item 401 that wirelessly transmits the 5GID and GTIN. The operation may differ in other examples. Before serving item 401, wireless receiver 111 exchanges authentication signaling with AMF 422 over 5GNR AN 415. AMF 422 interacts with UDM 423 to authenticate the identity of wireless receiver 411. AMF 422 determines the geographic location of receiver 411. AMF 422 interacts with UDM 423 to select APIs for slices 432-433 and API selection instructions for wireless receiver 411 based on its identity and location. AMF 422 transfers the instructions and APIs for slices 432-433 to wireless receiver 411 over 5GNR AN 415.

Item 401 wirelessly transfers its 5GID and GTIN, and wireless receiver 411 wirelessly detects the 5GID and the GTIN from item 401. Wireless receiver 411 selects an API for slice 432 based on the API selection instructions and 5G ID from item 401. Wireless receiver 411 generates an API call for slice 432 that indicates the 5G ID, the GTIN, and the geographic location for item 401 based on the selected API. Wireless receiver 411 transfers the API call to AMF 421 over an N1 link that traverses 5GNR AN 415. AMF 421 transfers the API call for slice 432 to AF 435 in slice 435. AF 435 transfers the 5G ID, GTIN, and location for item 401 to UDSF 424. UDSF 424 selects dAPP ledger 445 based on the 5G ID for item 401. UDSF 424 indicates dAPP ledger 445 to AF 435. AF 435 transfers the 5G ID, GTIN, and location for item 401 to selected dAPP ledger 445.

Item 401 wirelessly transfers its 5GID and GTIN, and now, wireless receiver 412 wirelessly detects the 5GID and the GTIN from item 401. Wireless receiver 412 selects an API for slice 433 based on the API selection instructions and 5G ID. Wireless receiver 412 generates an API call that indicates the 5G ID, the GTIN, and the geographic location for item 401 based on the selected API. Wireless receiver 412 transfers the API call to AMF 421 over an N1 link that traverses 5GNR AN 415. AMF 421 transfers the API call for slice 433 to AF 436. AF 436 transfers the 5G ID, GTIN, and location for item 401 to UDSF 424. UDSF 424 selects dAPP ledger 448 based on the location for item 401. UDSF 424 indicates dAPP ledger 448 to AF 436. AF 436 transfers the 5G ID, GTIN, and location for item 401 to selected dAPP ledger 448.

Figure 11:
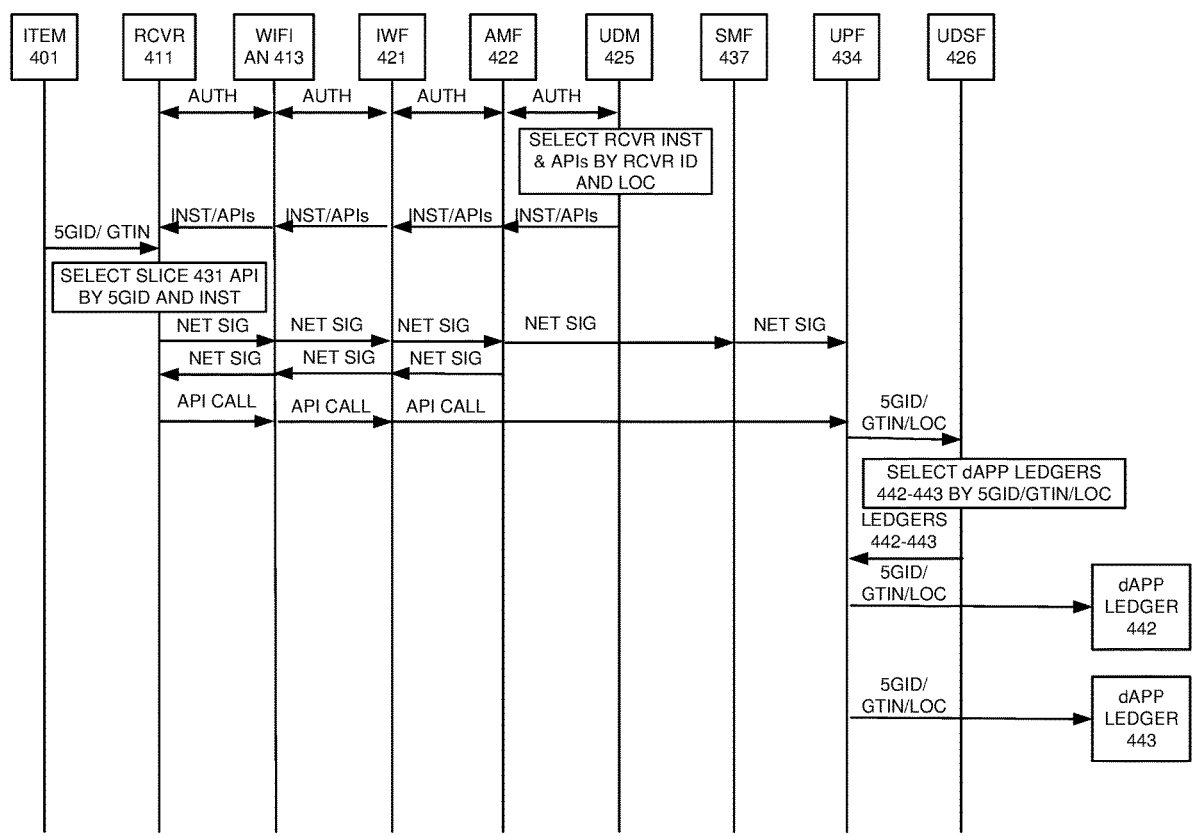
FIG. 11 illustrates an exemplary operation of the 5G communication network to serve the item that wirelessly transmits the 5GID and the GTIN.

FIG. 11 illustrates an exemplary operation of 5G communication network 400 to serve item 401 that wirelessly transmits the 5GID and the GTIN. The operation may differ in other examples. Before serving item 401, wireless receiver 111 exchanges authentication signaling (AUTH) with AMF 422 over WIFI AN 413 and IWF 421. AMF 422 interacts with UDM 423 to authenticate the identity of wireless receiver 411. AMF 422 determines a geographic location of wireless receiver 411. AMF 422 interacts with UDM 423 to select slices 431-433, their APIs, and API selection instructions for wireless receiver 411 based on its identity and location. AMF 422 transfers the instructions and APIs for slices 431-433 to wireless receiver 411.

Item 401 wirelessly transfers its 5GID and GTIN, and wireless receiver 411 wirelessly detects the 5GID and the GTIN. Wireless receiver 411 selects an API for slice 431 based on the API selection instructions and 5G ID. Wireless receiver 411 generates an API call that indicates the 5G ID, the GTIN, and the geographic location for item 401 based on the selected API. To make the API call to slice 431, wireless receiver 412 transfers network signaling for slice 431 to AMF 422 over WIFI AN 413 and IWF 421. AMF 422 transfers network signaling for slice 431 to SMF 437. SMF 437 transfers network signaling for slice 431 to UPF 434. AMF 422 transfers network signaling for slice 431 to IWF 421 and wireless receiver 401 (over IWF 421 and AN 413). Wireless receiver 411 transfers an API call for slice 431 to UPF 434 over IWF 421 and AN 413. UPF 434 interacts with UDSF 424 to select dAPP ledgers 442-443 based on the 5G ID, GTIN, and location for item 401. UDSF 424 indicates dAPP ledgers 442-443 to UPF 434. UPF 434 transfers the 5G ID, GTIN, and location for item 401 to selected dAPP ledgers 442-443.

The wireless data network circuitry described above comprises computer hardware and software that form special-purpose network circuitry to serve items that wirelessly transfer their network IDs and product IDs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve items that wirelessly transfer their network IDs and product IDs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve an item that wirelessly transmits a network identifier (ID) and a product ID, the method comprising:
a wireless network controller authenticating a wireless receiver and responsively transferring receiver instructions and Application Programming Interfaces (APIs) for wireless network slices to the wireless receiver;
the wireless receiver receiving the receiver instructions and the APIs for the wireless network slices from the wireless network controller, wirelessly detecting the network ID and the product ID wirelessly transmitted by the item at a geographic location, selecting one of the APIs based on the receiver instructions and the network ID, generating an API call that indicates the network ID, the product ID, and the geographic location for the item based on the selected one of the APIs, and transferring the API call for delivery to the selected one of the wireless network slices; and
the selected one of the wireless network slices receiving the API call that indicates the network ID, the product ID, and the geographic location for the item, selecting a distributed Application (dAPP) that is associated with the item based on at least one of the network ID, the product ID, and the geographic location for the item, and transferring the network ID, the product ID, and the geographic location for the item to selected dAPP.

2. The method of claim 1 wherein the wireless receiver selecting the one of the APIs comprises selecting the one of the APIs based on the receiver instructions, the network ID, and the product ID.

3. The method of claim 1 wherein the wireless receiver selecting the one of the APIs comprises selecting the one of the APIs based on the receiver instructions, the network ID, and the geographic location.

4. The method of claim 1 wherein the selected one of the wireless network slices selecting the dAPP for the item comprises selecting the dAPP based on the product ID.

5. The method of claim 1 wherein the selected one of the wireless network slices selecting the dAPP for the item comprises selecting the dAPP based on the network ID.

6. The method of claim 1 wherein the selected one of the wireless network slices selecting the dAPP for the item comprises selecting the dAPP based on the geographic location.

7. The method of claim 1 wherein the wireless network controller comprises an Access and Mobility Management Function (AMF) and a Unified Data Management (UDM).

8. The method of claim 1 wherein the selected one of the wireless network slices comprises an Application Function (AF).

9. The method of claim 1 wherein the selected one of the wireless network slices comprises a User Plane Function (UPF).

10. The method of claim 1 where the product ID comprises a Global Trade Item Number (GTIN).

11. A wireless communication network to serve an item that wirelessly transmits a network identifier (ID) and a product ID, the wireless communication network comprising:
a wireless network controller configured to authenticate a wireless receiver and responsively transfer receiver instructions and Application Programming Interfaces (APIs) for wireless network slices to the wireless receiver;
the wireless receiver configured to receive the receiver instructions and the APIs for the wireless network slices from the wireless network controller, wirelessly detect the network ID and the product ID wirelessly transmitted by the item at a geographic location, select one of the APIs based on the receiver instructions and the network ID, generate an API call that indicates the network ID, the product ID, and the geographic location for the item based on the selected one of the APIs, and transfer the API call for delivery to the selected one of the wireless network slices; and
the selected one of the wireless network slices configured to receive the API call that indicates the network ID, the product ID, and the geographic location for the item, select a distributed Application (dAPP) that is associated with the item based on at least one of the network ID, the product ID, and the geographic location for the item, and transfer the network ID, the product ID, and the geographic location for the item to selected dAPP.

12. The wireless communication network of claim 11 wherein the wireless receiver is configured to select the one of the APIs based on the receiver instructions, the network ID, and the product ID.

13. The wireless communication network of claim 11 wherein the wireless receiver is configured to select the one of the APIs based on the receiver instructions, the network ID, and the geographic location.

14. The wireless communication network of claim 11 wherein the selected one of the wireless network slices is configured to select the dAPP for the item based on the product ID.

15. The wireless communication network of claim 11 wherein the selected one of the wireless network slices is configured to select the dAPP for the item based on the network ID.

16. The wireless communication network of claim 11 wherein the selected one of the wireless network slices is configured to select the dAPP for the item based on the geographic location.

17. The wireless communication network of claim 11 wherein the wireless network controller comprises an Access and Mobility Management Function (AMF) and a Unified Data Management (UDM).

18. The wireless communication network of claim 11 wherein the selected one of the wireless network slices comprises an Application Function (AF).

19. The wireless communication network of claim 11 wherein the selected one of the wireless network slices comprises a User Plane Function (UPF).

20. The wireless communication network of claim 11 where the product ID comprises a Global Trade Item Number (GTIN).

\* \* \* \* \*